(12) United States Patent
Sugimoto et al.

(10) Patent No.: US 11,514,700 B2
(45) Date of Patent: Nov. 29, 2022

(54) IMAGE-PROCESSING DEVICE, IMAGE-PROCESSING METHOD, AND STORAGE MEDIUM ON WHICH PROGRAM IS STORED

(71) Applicant: NEC CORPORATION, Tokyo (JP)

(72) Inventors: Michiru Sugimoto, Tokyo (JP); Katsuhiko Kondoh, Tokyo (JP); Yuichi Nakatani, Tokyo (JP); Junya Akiyama, Tokyo (JP); Satoshi Segawa, Tokyo (JP); Yasushi Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 4 days.

(21) Appl. No.: 17/044,112

(22) PCT Filed: Mar. 26, 2019

(86) PCT No.: PCT/JP2019/012884
§ 371 (c)(1),
(2) Date: Sep. 30, 2020

(87) PCT Pub. No.: WO2019/194026
PCT Pub. Date: Oct. 10, 2019

(65) Prior Publication Data
US 2021/0192200 A1    Jun. 24, 2021

(30) Foreign Application Priority Data

Apr. 2, 2018  (JP) .............................. JP2018-071142

(51) Int. Cl.
*G06K 9/00* (2022.01)
*G06V 30/413* (2022.01)
(Continued)

(52) U.S. Cl.
CPC ......... *G06V 30/413* (2022.01); *G06K 9/6262* (2013.01); *G06V 30/414* (2022.01); *G06V 30/10* (2022.01)

(58) Field of Classification Search
CPC .... G06V 30/413; G06V 30/414; G06V 30/10; G06V 30/1983; G06V 30/412; G06K 9/6262
See application file for complete search history.

(56) References Cited

U.S. PATENT DOCUMENTS 10,089,555 B2 * 10/2018 Russell .............. G06V 30/2504
2008/0008383 A1   1/2008 Andel et al.
(Continued)

FOREIGN PATENT DOCUMENTS

CN    104239853 A    12/2014
EP       1793338 A2    6/2007
(Continued)

OTHER PUBLICATIONS

International Search Report for PCT/JP2019/012884 dated Jun. 18, 2019 [PCT/ISA/210].
(Continued)

*Primary Examiner* — Dhaval V Patel
(74) *Attorney, Agent, or Firm* — Sughrue Mion, PLLC

(57) ABSTRACT

An image-processing device includes: a reliability calculation unit configured to calculate reliability of a character recognition result for a document image which is a character recognition target on the basis of a descriptive feature amount of a character string of a specific item included in the document image; and an image output unit configured to output an image of the character recognition result indicating the character string of the specific item in a display mode in accordance with the reliability.

6 Claims, 11 Drawing Sheets

(51) Int. Cl.
*G06K 9/62* (2022.01)
*G06V 30/414* (2022.01)
*G06V 30/10* (2022.01)

(56) References Cited

U.S. PATENT DOCUMENTS

| | | | |
|---|---|---|---|
| 2013/0011055 A1 | 1/2013 | You et al. | |
| 2014/0270386 A1* | 9/2014 | Leihs | G08G 1/0175 |
| | | | 382/105 |
| 2015/0278619 A1* | 10/2015 | Pakhchanian | G06V 10/235 |
| | | | 382/310 |
| 2018/0025222 A1* | 1/2018 | Yellapragada | G06F 40/279 |
| | | | 382/176 |
| 2018/0082146 A1* | 3/2018 | Krivopaltsev | G06V 30/40 |
| 2018/0189561 A1* | 7/2018 | Bertan | G06V 30/412 |
| 2018/0349693 A1* | 12/2018 | Watanabe | G06V 30/418 |
| 2021/0049394 A1* | 2/2021 | Nakatani | G06V 30/1983 |

FOREIGN PATENT DOCUMENTS

| | | |
|---|---|---|
| JP | 2003-242441 A | 8/2003 |
| JP | 2004-152115 A | 5/2004 |
| JP | 2006-79190 A | 3/2006 |
| JP | 2014-137605 A | 7/2014 |
| JP | 2017-173881 A | 9/2017 |

OTHER PUBLICATIONS

Extended European Search Report for EP Application No. 19780887.6 dated on Mar. 25, 2021.
WNEK Janusz: "Machine Learning of Generalized Document Templates for Data Extraction", International Workshop on Document Analysis Systems, [Online] vol. 2423, Aug. 21, 2002 (Aug. 21, 2002). pp. 457-468, XP055785912, Berlin, Heidelberg, DOI: 10.1007/3-540-45869-7_49, ISBN: 978-3-540-45869-2, Retrieved from the Internet: URL:https://link.springer.com/content/pdf/10.1007/3-540-45869-7_49.pdf>.
Singaporean Office Action for SG Application No. 11202009518S dated Jun. 14, 2022.

* cited by examiner

FIG. 5

<RECORD TABLE>

| FORM ID | IMAGE DATA | RECORD CHARACTER STRING 1 | RECORD CHARACTER STRING 2 | RECORD CHARACTER STRING 3 | RECORD CHARACTER STRING 4 |
|---|---|---|---|---|---|
| ... | ... | ... | ... | ... | ... |
| ... | ... | ... | ... | ... | ... |
| ... | ... | ... | ... | ... | ... |

FIG. 8

```
                              RECEIPT           PAGE 001/001
                                                DECEMBER 22, 2016
   DEAR AAA INDUSTRY CO., LTD.                                      ─C1
   DEVELOPMENT DIVISION                 DELIVERY NOTE NUMBER  473029369
   SECOND SECTION  MANAGER  YAMADA TARO
   〒123-4567 OSU, SHIBUYA-KU, TOKYO             ▓473029369▓  ~A1
   FOUR SEASONS BUILDING 5F
      (03)1234-5688

¥ 196,592.-
   ABCDEFGH                            (SALES ORDER NUMBER 361-00020  GSD729)
   ORDER NUMBER : AB02512216 ─C2                    (3610020)              ─C3
```

| USED PLACE / INSTALLATION SITE | ▓AB02512216▓ ─A2 | | ▓3610020▓ ─A3 | |

| ORDER NO. / PAGE NO. | ITEM NAME / MODEL NO. | | QUANTITY | QUANTITY UNIT PRICE | TOTAL PRICE |
|---|---|---|---|---|---|
| AB02512216 0001 | JQ6E-4LV-C2 | A20003-57026 | EA. | 1 / 18,500 | 18,500 |
| AB02512216 0002 | JQGE-STUD-UNIT | A20003-46405 | EA. | 1 / 2,500 | 2,500 |
| AB02512216 0003 | JQGE-CCPU-A1 | A20003-46055 | EA. | 1 / 40,000 | 40,000 |
| AB02512216 0004 | JO6F-2BR-A2 | A20003-46215 | EA. | 1 / 47,000 | 47,000 |
| AB02512216 0005 | IEZ-2BC-2D(WH) | A20003-61555 | EA. | 1 / 22,180 | 22,180 |
| AB02512216 0006 | AC-VO UNIT | A20003-53275 | EA. | 1 / 1,850 | 1,850 |
| AB02512216 0007 | JQ6E-PDV01B-1B | A20003-45360 | EA. | 1 / 50,000 | 50,000 |
| | SUBTOTAL | | | | 182,030 |
| | CONSUMPTION AND LOCAL CONSUMPTION TAXES | | | | 14,562 |
| | FOLLOWING MARGIN | | | | |
| | | | | | |
| | | | | | |
| | | | | | |
| | | | | | |
| | TOTAL | | | | 196,592 |

IT WAS ACCEPTED AS ABOVE.
  DATA OF ACCEPTANCE DECEMBER 22, 2016 ─C4   YOUR COMPANY
  YOUR COMPANY NAME                           SEAL
          ▓DECEMBER 22, 2016▓ ─A4     ┌─────────────┐
                                      │   SAMPLE    │
  (DEPARTMENT NAME)                   │ ○○ OVERSEA │
          SALES DEVELOPMENT DEPARTMENT│ DEVELOPMENT │   003
  (DEPARTMENT NAME)                   │  NIN SHIN   │  P-300
          PROCUREMENT GROUP           │  GO GROUP   │
                                      └─────────────┘

[ OK ]  [ NG ]

IMAGE-PROCESSING DEVICE, IMAGE-PROCESSING METHOD, AND STORAGE MEDIUM ON WHICH PROGRAM IS STORED

CROSS REFERENCE TO RELATED APPLICATIONS

This application is a National Stage of International Application No. PCT/JP2019/012884, filed on Mar. 26, 2019, which claims priority from Japanese Patent Application No. 2018-071142, filed on Apr. 2, 2018, the contents of all of which are incorporated herein by reference in their entirety.

TECHNICAL FIELD

The present invention relates to an image-processing device, an image processing-method, and a storage medium on which a program is stored.

BACKGROUND ART

Several technologies for evaluation of content read through optical character recognition have been proposed.

For example, Patent Document 1 discloses a technology for determining similarity by converting advertisement contents into text using optical character recognition software or the like and comparing characteristic words in text information with each other in order to support advertisement review.

Patent Document 2 discloses a technology for determining a group of continuous pieces of character data as a line when optical character recognition is applied to image data of a receipt and identical or seemingly similar character data are arranged continuously in a predetermined direction a predetermined number of times or more.

CITATION LIST

Patent Literature

Patent Document 1

Japanese Unexamined Patent Application, First Publication No. 2017-173881

Patent Document 2

Japanese Unexamined Patent Application, First Publication No. 2006-079190

SUMMARY OF THE INVENTION

Problems to be Solved by the Invention

It is important not only to evaluate content read through optical character recognition but also to evaluate precision of a result of the optical character recognition. For example, when a checker of a result of optical character recognition can know reliability of a reading result, it is possible to take measures of causing the checker to check the result very carefully or causing two checkers to perform double-checking, if the reliability is low.

An example objective of the present invention is to provide an image-processing device, an image-processing method, and a program capable of solving the above-described problems.

Means for Solving the Problems

According to a first aspect of the present invention, an image-processing device includes: a reliability calculation unit configured to calculate reliability of a character recognition result for a document image which is a character recognition target on the basis of a descriptive feature amount of a character string of a specific item included in the document image; and an image output unit configured to output an image of the character recognition result indicating the character string of the specific item in a display mode in accordance with the reliability.

According to a second aspect of the present invention, an image-processing method includes: calculating reliability of a character recognition result for a document image which is a character recognition target on the basis of a descriptive feature amount of a character string of a specific item included in the document image; and outputting an image of the character recognition result indicating the character string of the specific item in a display mode in accordance with the reliability.

According to a third aspect of the present invention, a program stored in a storage medium causes a computer to perform processing of: calculating reliability of a character recognition result for a document image which is a character recognition target on the basis of a descriptive feature amount of a character string of a specific item included in the document image; and outputting an image of the character recognition result indicating the character string of the specific item in a display mode in accordance with the reliability.

Advantageous Effects of Invention

According to the present invention, it is possible to evaluate precision of a result of optical character recognition.

BRIEF DESCRIPTION OF THE DRAWINGS

FIG. 5 is a diagram illustrating an overview of a recording table stored in a database according to a first embodiment.

FIG. 8 is a diagram illustrating a display example of a checking screen displayed by a display unit according to the first embodiment.

EXAMPLE EMBODIMENT

Hereinafter, embodiments of the present invention will be described, but the following embodiments do not limit the present invention described in the claims. All combinations of the characteristics described in the embodiments are not necessarily essential for solutions of the present invention.

Figure 1:
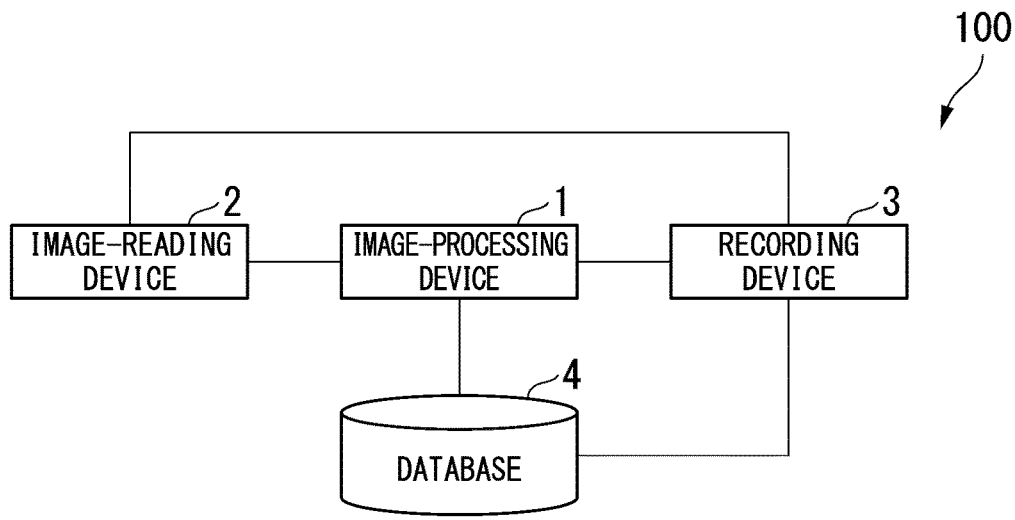
FIG. 1 is a diagram illustrating an example of a device configuration of an image processing system including an image-processing device according to an embodiment.

FIG. 1 is a diagram illustrating an example of a device configuration of an image processing system including an image-processing device according to an embodiment.

In the configuration illustrated in FIG. 1, an image processing system 100 includes an image-processing device 1, an image-reading device 2, a recording device 3, and a database 4.

The image-processing device 1 is connected to the image-reading device 2 via a communication cable. The image-reading device 2 optically acquires image data such as document forms or the like and outputs the image data to the image-processing device 1. The image-processing device 1 performs an optical character recognition (OCR) process on the image data of the document form to recognize characters. The image-processing device 1 outputs a character recognition result to the recording device 3 and the recording device 3 records the character recognition result on a database.

Documents which are targets of the image-processing device 1 are not limited to specific kinds of documents. Various documents on which the OCR process can be performed can be set as processing targets of the image-processing device 1.

The database 4 is connected to the image-processing device 1 and the recording device 3. The database 4 stores a correspondence relation between image data of a plurality of document forms previously registered by the recording device 3 and record character strings indicating character strings which are recording targets among character strings included in the image data. The character strings indicated by the record character strings are important character strings which have to be recorded and stored on the database 4 among the character strings described in document forms. An operator who uses the image processing system 100 records image data of a plurality of document forms previously registered using the recording device 3 and record character strings among character strings included in the image data on the database 4 in advance.

The operator is referred to as a user of the image-processing device 1 or is simply referred to as a user.

The correspondence relation between image data of the document forms and information regarding the record character strings indicating character strings which are recording targets among information regarding character strings included in the image data is assumed to be recorded sufficiently with regard to many document forms on the database 4. In this state, the image-processing device 1 performs a process.

Figure 2:
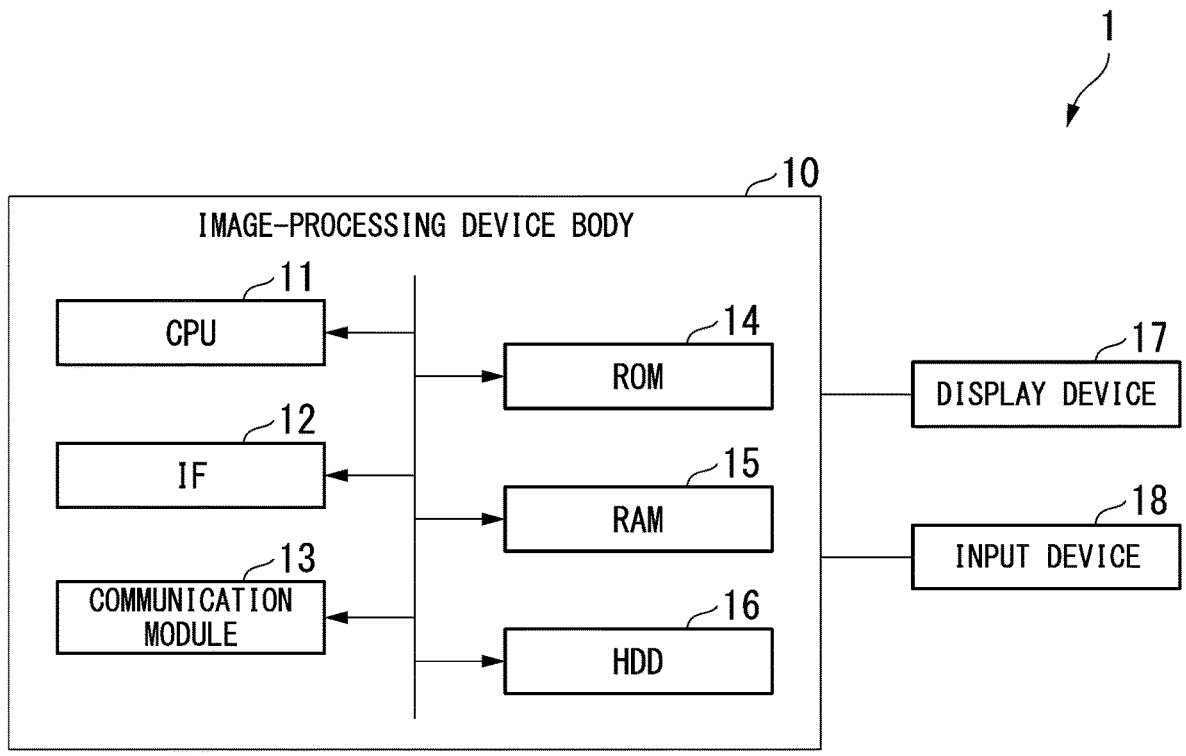
FIG. 2 is a diagram illustrating an example of a hardware configuration of the image-processing device according to the embodiment.

FIG. 2 is a diagram illustrating an example of a hardware configuration of the image-processing device.

In a configuration illustrated in FIG. 2, the image-processing device 1 includes an image-processing device body 10, a display device 17, and an input device 18.

The image-processing device boy 10 is a computer that includes a central processing unit (CPU) 11, an interface (IF) 12, a communication module 13, a read-only memory (ROM) 14, a random access memory (RAM) 15, and a hard disk drive (HDD) 16. The communication module 13 may perform wireless communication or wired communication with the image-reading device 2, the recording device 3, and the database 4 and may have both of these functions.

The display device 17 includes, for example, a display screen such as a liquid crystal panel or a light-emitting diode (LED) panel.

The input device 18 is, for example, a device such as a keyboard and a mouse, a touch sensor that is provided on a display screen of the display device 17 and configures a touch panel, or a combination thereof, and receives a user operation.

First Embodiment

Figure 3:
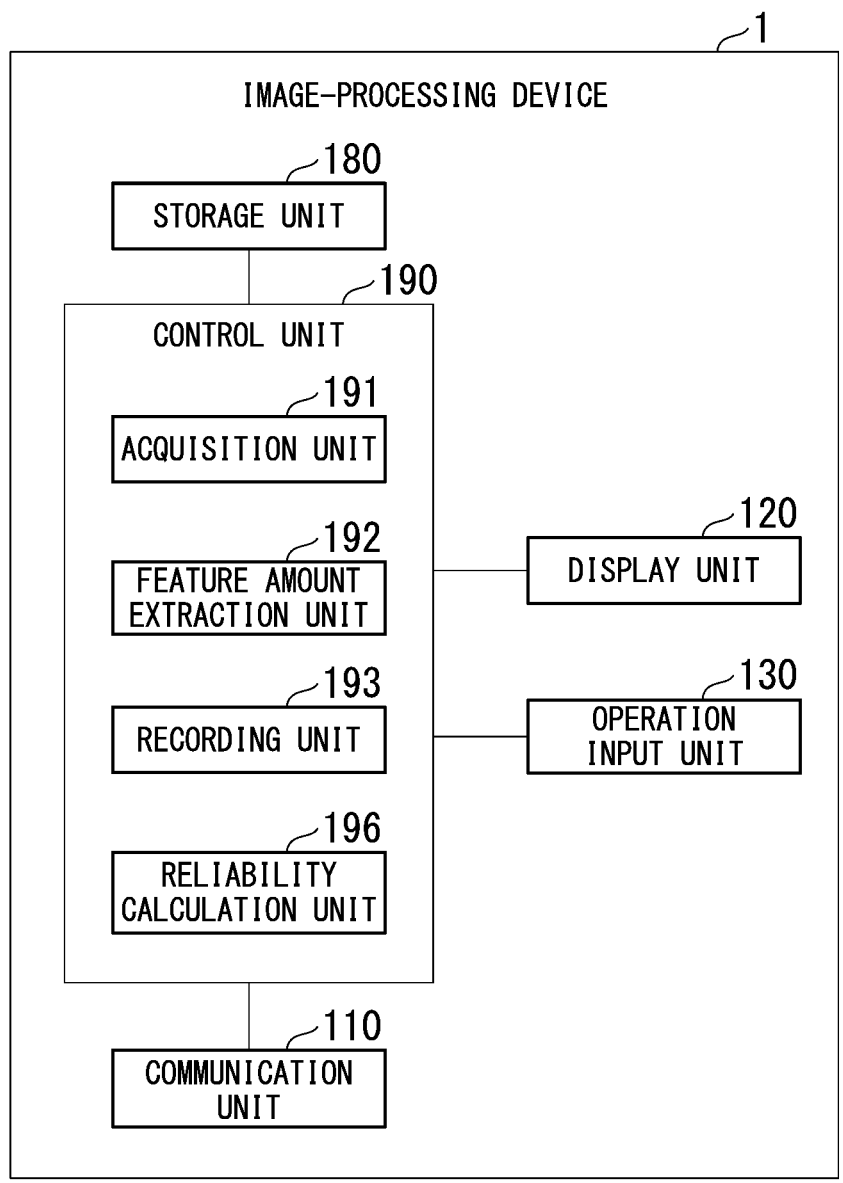
FIG. 3 is a schematic block diagram illustrating a functional configuration of an image-processing device according to a first embodiment.

FIG. 3 is a schematic block diagram illustrating a functional configuration of an image-processing device 1 according to a first embodiment.

A communication unit 110 is configured using the communication module in FIG. 2 and communicates with another device. In particular, the communication unit 110 communicates with the image-reading device 2, the recording device 3, and the database 4.

A display unit 120 is configured using the display device 17 in FIG. 2 and displays various images.

In particular, the display unit 120 corresponds to an example of an image output unit and outputs a character recognition result image indicating a character string of a specific item in a display mode in accordance with reliability calculated by a reliability calculation unit 196. The display mode indicates, for example, a display format of a character string in an image. The display mode in accordance with the reliability indicates, for example, a display mode in which the degree of emphasis is different in accordance with the reliability.

In this way, the image-processing device 1 can evaluate precision of a result of optical characteristic recognition through calculation of the reliability. Then, the image-processing device 1 can present the evaluation of the precision of the result of the optical character recognition to the operator by displaying the reliability. The operator can ascertain a portion which is noteworthy with reference to the display of the reliability and take measures as necessary.

Here, a method in which an output unit outputs a character recognition result image is not limited to the method of displaying an image. For example, the communication unit 110 may function as the output unit and transmit image data of the character recognition result image to another device to display the image data of the character recognition result image.

An operation input unit 130 is configured using the input device in FIG. 2 and receives a user operation.

A storage unit 180 is configured using the ROM 14, the RAM 15, and the HDD 16 in FIG. 2 and stores various kinds of data.

A control unit 190 is configured by causing the CPU 11 in FIG. 2 to read a program from the storage unit 180 (the ROM 14, the RAM 15, and the HDD 16 in FIG. 2) and execute the program. The control unit 190 controls each unit of the image-processing device 1 such that various processes are performed.

An acquisition unit 191 acquires image data of a document form.

A feature amount extraction unit 192 extracts first feature amounts indicating features of a record character string included in the image data of the document form for each piece of image data of the document form on the basis of recognition results of image data of a plurality of document forms. Extraction of the feature amounts is also referred to as generation of feature amounts.

In particular, the feature amount extraction unit 192 specifies a record character string included in a document image processed through the character recognition and extracts the first feature amounts in the document image of the specified record character string. Specifically, the feature amount extraction unit 192 corresponds to an example of a record character string specifying unit and specifies a character string designated as a record character string among character strings obtained as results of the character recognition of processing target document images. When a plurality of candidates for the record character strings are specified, the feature amount extraction unit 192 causes the display unit 120 to output a checking screen and extracts feature amounts of the record character string at position specified by a user on the checking screen. In particular, the feature amount extraction unit 192 extracts, as a record character string, feature amounts specified through a user operation on a document image displayed so that the character string is specified.

Specifying the record character string mentioned here means determining one of the character strings in a document form as one record character string.

A recording unit 193 extracts and records a record character string among information regarding character strings read from image data of new document forms by using feature amounts of the character strings in image data of the new document forms. In particular, the recording unit 193 corresponds to an example of a record character string extraction unit and extracts a record character string from a character recognition result for a new document image by using the feature amounts of the record character string extracted by the feature amount extraction unit 192.

The reliability calculation unit 196 calculates reliability of a processing result by the image-processing device 1. In particular, when the image-processing device 1 extracts the record character string from an image of a new document form at the time of actual operation of the image processing system 100, the reliability calculation unit 196 calculates descriptive reliability of the obtained record character string. Specifically, the reliability calculation unit 196 calculates reliability of a character recognition result for a document image which is a character recognition target on the basis of the descriptive feature amounts of the character string of the specific item included in the document image. The character string of the specific item mentioned here may be a record character string or may be a predetermined character string other than the record character string. For example, the character string of the specific item may be a character string other than the record character string and a character string of which a position is designated in advance.

Any of various feature amounts can be used as feature amounts used for the reliability calculation unit 196 to calculate the reliability.

For example, the reliability calculation unit 196 may calculate the reliability on the basis of the feature amounts of a format of a document image which is a character recognition target among the feature amounts which are recorded in advance based on results of learning obtained using a plurality of document images and indicate features of character strings of items for each kind of document image and each specific item. For example, the reliability calculation unit 196 may calculate the reliability of a processing result by the image-processing device 1 on the basis of feature amounts related to descriptive features of a character string of a specific item, such as an attribute of characters included in the character string of the specific item or coordinates of a range of the character string.

The item indicates, for example, a predetermined kind of information included in a document image. The item is, for example, date and time information, address information, belonging information, commodity information, or numerical information. The specific item is one item or a plurality of items specified in advance among a plurality of items included in the document image.

The feature amounts are, for example, values that quantitatively indicates predetermined features of the character string of the specific item, related to the format in a document image. The number of predetermined features may be plural. The predetermined feature may be different in accordance with a character string or may be the same among a plurality of character strings.

The reliability indicates, for example, correlation between feature amounts of characteristic characters of each feature item acquired based on a plurality of document images and feature amounts of a character string of each specific item in a processing target document image. The reliability may be, for example, similarity between feature amounts of characteristic characters of each specific item acquired based on a plurality of document images and feature amounts of a character string of each specific item in a processing target document image.

The format mentioned here include attributes of characters and coordinates of a range of a character string.

The attributes of characters mentioned here (character attributes) are information expressed by numbers, alphabetical letters, hiragana letters, kanji, the number of characters, character heights, and fonts. The coordinates of the range of the character string are coordinates indicating a position of a character string in a document form. For example, the coordinates of the range of the character string may be information indicating coordinates of a first character, coordinates of an end character, or the like included in the character string. Hereinafter, the attributes of characters included in a character string and the coordinates of a range of the character string are collectively referred to as attributes of the character string or character string attributes.

Alternatively, the reliability calculation unit 196 may calculate the reliability of a processing result by the image-processing device 1 on the basis of both the reliability of the character recognition and the feature amounts related to the descriptive features of the character string of the specific item.

When the reliability calculation unit 196 calculates the reliability of the processing result by the image-processing device 1 on the basis of the feature amounts related to the descriptive feature of the character string of the specific item, the reliability calculation unit 196 may use feature amounts of a document image processed through analysis of a format of a document without being limited to the processing target document image.

For example, the reliability calculation unit 196 may calculate the reliability on the basis of the degree of variation in feature amounts recorded in advance with regard to a processed document image. When the degree of variation in the feature amounts is high, possible reasons that the format of a document given to the image-processing device is not constant or features of the format analyzed by the image-processing device 1 do not sufficiently reflect an actual format are conceivable. In this case, there is a high possibility of the format of a processing target document image being different from a format assumed in the image-processing device 1. From this viewpoint, the reliability of the processing result for the processing target document image processed by the image-processing device 1 is considered to be low.

Conversely, when the degree of variation in the feature amounts is low, it is considered that the format of a document given to the image-processing device is constant and features of the format analyzed by the image-processing device 1 sufficiently reflect an actual format. In this case, a format of a processing target document image is the same as a format assumed in the image-processing device 1 and the reliability of the processing result for the processing target document image by the image-processing device 1 is considered to be high. That is, the image-processing device 1 is expected to appropriately process a processing target image.

Alternatively, the reliability calculation unit 196 may calculate the reliability of the feature amounts in a document image which is a character recognition target on the basis of the degree of deviation in feature amounts recorded in advance. The degree of deviation mentioned here is a magnitude of a difference in a standard value such as an average, a median, or a mode. A high degree of deviation means that a difference from a standard value is large. A low degree of deviation means that a difference in a standard value is small.

When the degree of deviation is high, the reason that the format of a processing target document image is different from a format assumed in the image-processing device 1 or the features of the format analyzed by the image-processing device 1 are not appropriate for a processing target document image even though the assumed format is matched is considered. In this case, the reliability of the processing result for the processing target document image by the image-processing device 1 is considered to be relatively low.

When the degree of deviation in the feature amounts in the document image of the character recognition target with respect to the feature amounts recorded in advance is low, it is considered that the format of the processing target document image is the same as the format assumed by the image-processing device 1 and features of the format analyzed by the image-processing device 1 are appropriate for the processing target document image. In this case, the reliability of the processing result for the processing target document image by the image-processing device 1 is considered to be relatively high. That is, the image-processing device 1 is expected to appropriately process a processing target image.

Through such a process, the image-processing device 1 reduces an effort to record the character string information to be recorded included in the image data of a new document form.

Figure 4:
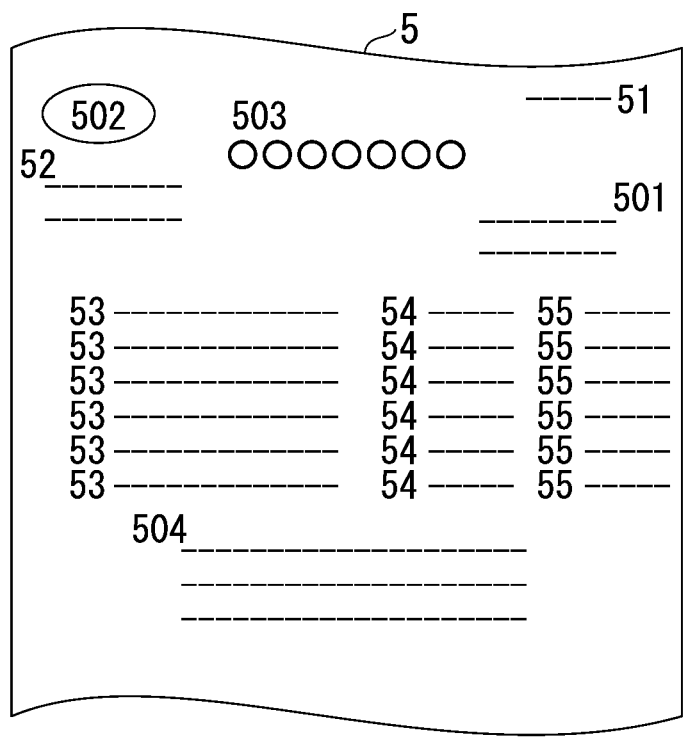
FIG. 4 is a diagram illustrating an example of a document form.

FIG. 4 is a diagram illustrating an example of a document form.

As illustrated in FIG. 4, in the document form, for example, a mark of a company generating the document, a creation date, a person in charge of creation, document content, and the like are described in a format specific to the document form. The document content indicates a single pair or a plurality of pairs of pieces of information such as names of ordered commodity and the number of ordered commodities, for example, when the document order is an order paper. The operator records a specific character string (a record character string) to be recorded among character strings described in the document form on the database 4 based on one certain document form using the recording device 3. Specifically, the operator inputs the record character string which the recording device 3 will record on the database 4, while seeing the document form. The operator causes the image-reading device 2 to read image data of the document form. The image-reading device 2 reads the document form based on an operation by the operator and outputs the document form to the image-processing device 1. Then, the recording device 3 records the image data of one document form and a record character string among character strings described in the document form on the database 4 in association therewith based on the operation by the operator and control of the image-processing device 1.

In the example of FIG. 4, items are, for example, a date and time 51, an order organization 52, a commodity name 53, a quantity 54, and an amount of money 55. In the example of FIG. 4, a character string of the date and time 51, the order organization 52, the commodity name 53, the quantity 54, and the amount of money 55 is a record character string. In the document form 5, other information such as a non-record character string which is not recorded by the operator is also printed. The information is, for example, a name 501 of an ordering party who issues the document form, an emblem image 502 of the ordering party, a title 503 of the document form, and a greeting 504.

FIG. 5 is a diagram illustrating an overview of a recording table stored in a database.

As illustrated in FIG. 5, in the database 4, a record table, in which image data of a document form is stored in association with a record character string among character strings described in the document form, is provided.

Figure 6:
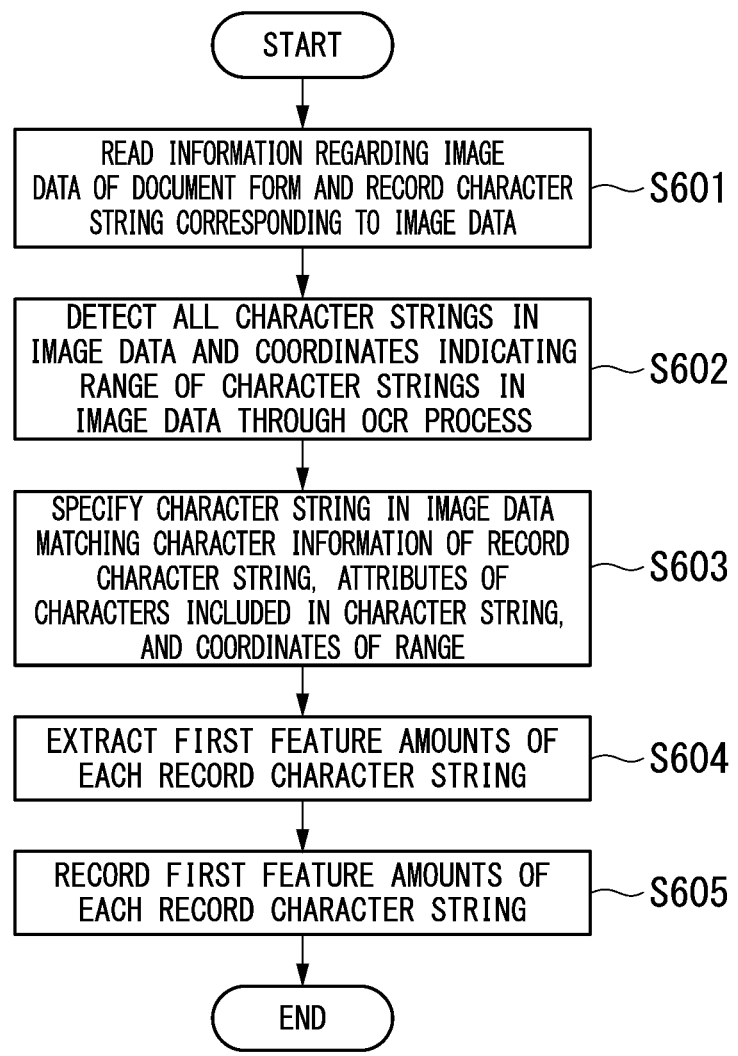
FIG. 6 is a first diagram illustrating a processing flow of the image-processing device according to the first embodiment.

FIG. 6 is a first diagram illustrating a processing flow of the image-processing device according to the first embodiment. FIG. 6 illustrates an example of a processing procedure in which the image-processing device 1 extracts first feature amounts.

Next, a processing flow of the image-processing device 1 will be described in order.

First, in the database 4, a plurality of combinations of image data of certain document forms with the same format and a record character string described in the document form are recorded. For example, a plurality of pieces of record character string information (information indicating the record character string) regarding the format of the document form 5 illustrated in FIG. 4 are assumed to be recorded.

As the combinations of the image data and the record character string information, for example, image data of document forms and record character string information handled in the past business can be used. When necessary amounts of image data and record character string information can be ensured from the past business, it is not necessary to separately prepare the image data and the record character string information in order for the image-processing device to acquire the first feature amounts.

In this state, the operator operates the image-processing device 1 and instructs the image-processing device 1 to start a process.

The acquisition unit 191 of the image-processing device 1 controls the communication unit 110 such that information regarding the image data of the document form and the record character string corresponding to the image data is read from the database 4 (step S601). The acquisition unit 191 outputs the image data and the record character string to the feature amount extraction unit 192.

The feature amount extraction unit 192 detects all the character strings in the image data and coordinates indicating a range of the character strings in the image data by performing an OCR process on the image data (step S602). The character string is a unity of characters formed by a plurality of characters. The feature amount extraction unit 192 analyzes the range of one unity in accordance with an interval or the like from other characters, extracts one character or a plurality of characters included in the range as a character string, and detects coordinates indicating the range of the character string in the image data. The characters included as the character string may include signs such as ideographs or phonographs, marks, and icon images.

The feature amount extraction unit 192 compares the character string extracted from the image data through the OCR process with the record character string read from the database 4 along with the image data. The feature amount extraction unit 192 specifies the character string in the image data matching character information of the record character string among the character strings extracted from the image data through the OCR process, attributes of characters included in the character string, and the coordinates of the range (step S603).

The attributes of the characters mentioned here (character attributes) are information expressed by numbers, alphabetical letters, hiragana letters, kanji, the number of characters, character heights, and fonts. The coordinates of the range of the character string are coordinates indicating a position of a character string in a document form. For example, the coordinates of the range of the character string may be information indicating coordinates of a first character, coordinates of an end character, or the like included in the character string. Hereinafter, the attributes of characters included in a character string and the coordinates of a range of the character string are collectively referred to as attributes of the character string or character string attributes.

The character information here may be only a character string or may include character string attributes. That is, the feature amount extraction unit 192 may determine whether the record character string and the character string in the image data are the same as the character strings. Alternatively, the feature amount extraction unit 192 may determine the sameness of the character string attributions in addition to the sameness of the characters.

When the feature amount extraction unit 192 cannot uniquely specify the character string in which the record character string matches the character information, the image-processing device 1 may exclude the document image from a processing target (an extraction target of the first feature amounts). Alternatively, the image-processing device 1 may cause the display unit 120 to display an image in which a range of each of candidates for the record character string is indicated by a frame and may cause to specify the character string selected by the operator as the record character string. The candidate for the record character string mentioned here is a character string associated with the record character string determined not to be uniquely specified among the character strings in which the character information matches the character information of the record character string. Specifying the record character string mentioned here means determining any one of the character strings in the document form as one record character string.

When the feature amount extraction unit 192 determines that the character information of each of the plurality of character strings in the document form matches the character information of one record character string, the plurality of character strings are candidates for the recording information. When the operator selects any one of the plurality of character strings, the record character string is uniquely specified.

Subsequently, the feature amount extraction unit 192 extracts feature amounts of each record character string which is common to the document forms with the same format by using the character string attributes extracted for each document form and for each record character string (step S604).

Specifically, the feature amount extraction unit 192 analyzes the character string attributes of the record character string in a plurality of document forms for each record character string and extracts one feature amount for one record character string.

A method in which the feature amount extraction unit 192 extracts the feature amount of each record character string which is common to a plurality of document forms with the same format is not limited to the specifying method. For example, the feature amount extraction unit 192 may obtain a mode for each item such as coordinates of a first character, coordinates of an end character, a kind of character, a height of a character, a kind of font, or the like with regard to the plurality of character string attributes obtained from the plurality of document forms. The feature amount extraction unit 192 may obtain an average or a median of attributes indicated by numerical values such as the coordinates of the first character, the coordinates of the end character, the heights of the characters, or distances between the characters for each item. The feature amount extraction unit 192 may use a feature amount including a range or a feature amount expressed as a plurality of numerical values, for example, by setting a maximum value and a minimum value in an item expressed as a numerical value as a feature amount. The feature amount extraction unit 192 may digitize attributes such as a kind of character or a kind of font other than numerical values and obtain the feature amount. The feature amount extraction unit 192 may extract the feature amount using a known machine learning algorithm.

When a plurality of numerical values are acquired with regard to one format of a document form and one record character string, the feature amount extraction unit 192 may vectorize the plurality of numerical values and extract a feature amount of one vector.

Feature amounts of each record character string which is common to a plurality of document forms with the same format and are extracted by the feature amount extraction unit 192 are referred to as first feature amounts. The feature amount extraction unit 192 uses a plurality of document forms with the same format to extract the first feature amounts of each record character string of the format. The first feature amounts are feature amounts used to extract a record character string. The first feature amount may include one of information indicating attributes of a character and the coordinates indicating a range of a character string, or a combination of the information and the coordinates.

The feature amount extraction unit 192 records the first feature amounts obtained for each record character string on the database 4 in association with an identifier of a format of a document form (step S605).

For example, the feature amount extraction unit 192 records the first feature amounts indicating the character attributes, the coordinates indicating the range of the character string, or the like of each of the date and time 51, the order organization 52, the commodity name 53, the quantity 54, and the amount of money 55 which are a record character string included in the format of the document form 5 in FIG. 4 on the database 4 in association with a format identifier of the document form 5.

After step S605, the image-processing device 1 ends the process of FIG. 6.

Through the above process, the image-processing device 1 can extract the information (the first feature amounts) used to reduce an effort to record the record character strings of the operator and accumulate the information in the database 4. Thus, the image-processing device 1 can receive an input of image data of a new document form and automatically record the record character strings included in the document form on the database 4. The process will be described with reference to FIG. 7.

Figure 7:
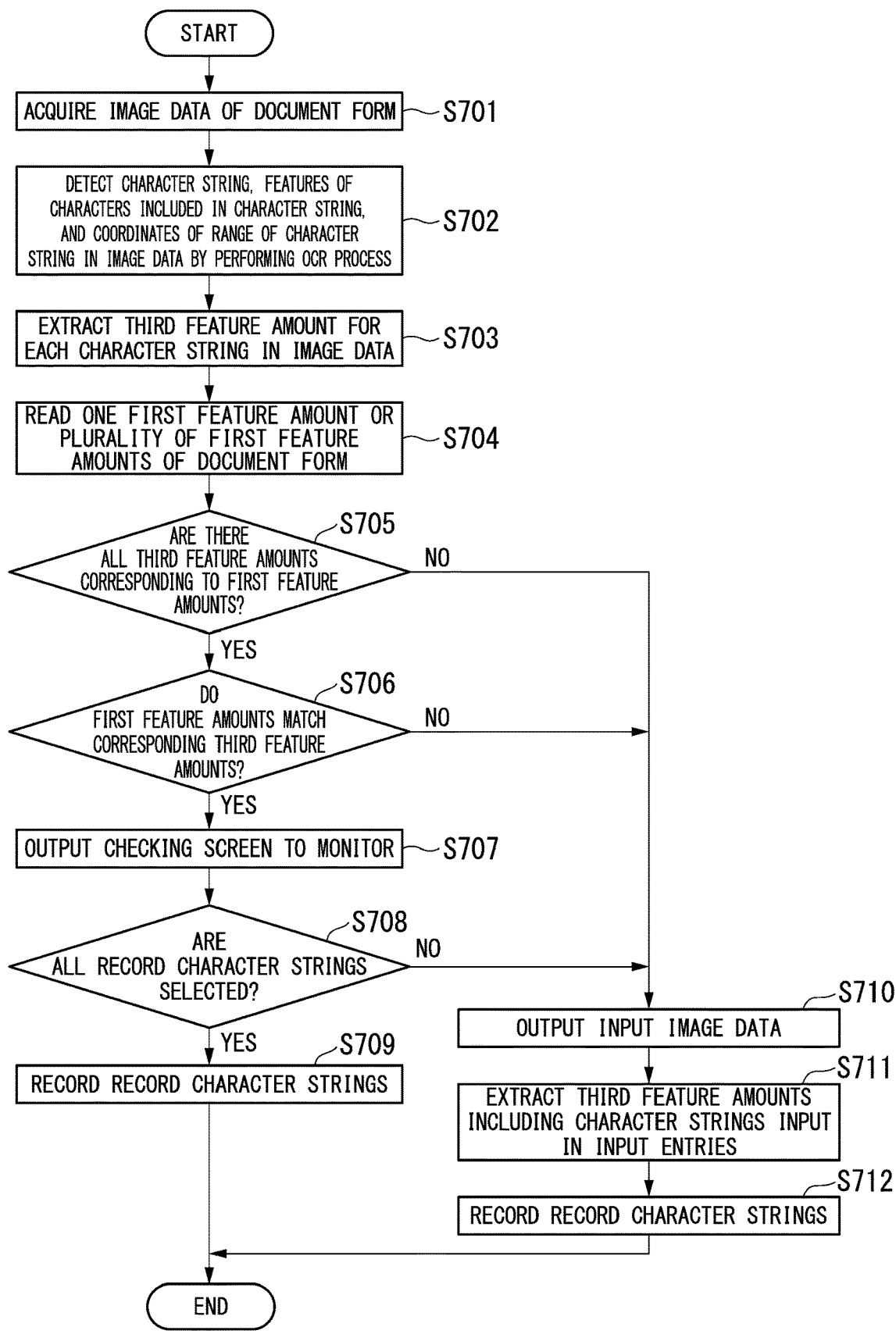
FIG. 7 is a second diagram illustrating a processing flow of the image-processing device according to the first embodiment.

FIG. 7 is a second diagram illustrating a processing flow of the image-processing device according to the first embodiment. FIG. 7 illustrates an example of a processing procedure in which the image-processing device 1 extracts the record character strings from newly input image data.

The operator performs an operation causing the image-reading device 2 to read a new document form. Then, the image-reading device 2 generates the image data of the document form and outputs (transmits) the image data to the image-processing device 1. The acquisition unit 191 of the image-processing device 1 acquires the image data from the data received by the communication unit 110 (step S701). The acquisition unit 191 outputs the image data to the feature amount extraction unit 192. The feature amount extraction unit 192 detects a character string, the features of the characters (the character attributes) included in the character string, and the coordinates of the range of the character string in the image data for each character string by performing the OCR process on the image data (step S702). The feature amount extraction unit 192 extracts third feature amounts obtained by processing the detected information as the feature amounts for each character string in the image data (step S703). That is, the third feature amounts are information indicating the features of the character string included in the document form of the newly read image data. Thereafter, the feature amount extraction unit 192 reads the first feature amounts of each record character string from the database 4 (step S704). The feature amount extraction unit 192 outputs the third feature amounts and the first feature amounts to the recording unit 193.

The recording unit 193 acquires the third feature amounts of each character string in the image data and the first feature amounts of each record character string. The recording unit 193 determines whether the third feature amount uniquely corresponds to each first feature amount (step S705). For example, the first feature amounts include the coordinates indicating the range of the character string. In this case, the recording unit 193 uses coordinates indicating the range of the character string included in each first feature amount to determine whether there are all the third feature amounts including coordinates corresponding to the coordinates indicated by each first feature amount.

When there are all the third feature amounts including the coordinates corresponding to the coordinates of the first feature amounts (YES in step S705), there is description of characters in all the entries in the document form corresponding to the recording character string. Conversely, when there are only some of the third feature amounts including the coordinates corresponding to the coordinates of the first feature amounts, there is no description of the characters in any entry in the document form.

In the case of YES in step S705, the recording unit 193 determines whether each character attribute included in the first feature amount matches each character attribute included in the third feature amount corresponding to the first feature amount (step S706).

When the determination result of step S706 is YES and the character attributes match each other (YES in step S706), the recording unit 193 generates a checking screen in which a rectangular frame is displayed in the range of the record character string based on the coordinates indicated by one third feature amount or the plurality of third feature amounts in the currently processed image data. The recording unit 193 outputs the checking screen to a monitor (step S707). The operator can check a rectangular region displayed on the checking screen and check a record character string which the image-processing device 1 will record. Thus, the operator can check whether the record character string is insufficient. That is, the operator can check whether all the record character strings are selected (whether the record character strings are surrounded by the rectangular frames on the checking screen).

An icon image of one of OK and NG buttons is displayed on the checking screen. The operator can give an instruction indicating that the selected record character string is not insufficient by selecting the OK button in the icon image. Conversely, the operator can give an instruction indicating that the selected record character string is insufficient by selecting the NG button in the icon image of the button.

The reason for outputting the checking screen to the monitor will be described with reference to FIG. 4. In FIG. 4, six commodity names 53 are entered among the record character strings. When the entered six commodity names 53 was a maximum in a past document form, the commodity names 53 are automatically determined to be the record character strings within a range of 1 to 6 in a new document form. Accordingly, for example, when seven commodity names 53 are entered in the new document form, the first to sixth commodity names are determined as YES in both of steps S705 and S706. Therefore, the image-processing device 1 may end without recording the seventh character string.

To ameliorate such an event, the image-processing device 1 displays the checking screen so that the operator checks whether to end the recording before the record character strings are recorded in step S707.

The display unit 120 displays the record character strings on the checking screen in a mode in accordance with the reliability.

FIG. 8 is a diagram illustrating a display example of a checking screen displayed by the display unit 120. In the example of FIG. 8, on the display unit 120, four record character strings obtained as a result of an OCR process performed on character strings C1 to C4 in an image of a document form are shown in regions A1 to A4. The display unit 120 displays the record character strings in the mode in accordance with the reliability.

In the example of FIG. 8, reliability of an OCR result by the image-processing device 1 is expressed in three stages for each record character. The reliability of the record character strings shown in the regions A1 and A2 is "high," the reliability of the record character string shown in the region A3 is "middle," and reliability of the record character string shown in the region A4 is "low." The display unit 120 displays the reliability of the record character string by displaying the rectangles of the regions A1 to A4 in the mode in accordance with the reliability.

In order for the display unit 120 to display the reliability, the reliability calculation unit 196 calculates the reliability for each record character string. As described above, the reliability calculation unit 196 can use various feature amounts as feature amounts used to calculate the reliability. The reliability calculation unit 196 may calculate the reliability of the entire document in addition to or instead of the reliability of each record character string.

The recording unit 193 determines whether all the record character strings are selected in response to pressing of the icon image of the button by the operator (step S708). When all the record character strings are selected (YES in step S708), the recording unit 193 records the record character strings in the record table in association with identification information of the document form (step S709).

For example, a third feature amount a3, a third feature amount b3, a third feature amount c3, and a third feature amount d3 are assumed to be acquired from the image data of the document form. It is assumed that the third feature amount a3 matches a first feature amount a1 recorded in advance on a database, the third feature amount b3 matches a first feature amount b1, the third feature amount c3 matches a first feature amount c1, and the third feature amount d3 matches a first feature amount d1. In this case, the recording unit 193 records the character strings corresponding to the third feature amount a3, the third feature amount b3, the third feature amount c3, and the third feature amount d3 as the record character strings on the record table of the document form. The character strings corresponding to the third feature amounts mentioned here are character strings of extraction sources of the third feature amounts.

After step S709, the image-processing device 1 ends the process of FIG. 7.

When step S705 is NO, step S706 is NO, or step S708 is NO, as described above, the recording unit 193 performs a process in a case in which there are no third feature amounts including the coordinates corresponding to the coordinates indicated by the first feature amounts. Specifically, the recording unit 193 generates input image data of a form image (an image of a document form) in which input entries are provided in the ranges of the coordinates of the first feature amounts for which there are no third feature amounts at the corresponding coordinates in the image data and outputs the input image data to the monitor (step S710). The input image data may be data described in a markup language such as HTML or XML. As in the case of the display of the checking screen in step S707, the display unit 120 may display the record character strings which can be specified on a form image in a display mode in accordance with the reliability.

The operator operates an input device such as a keyboard of the image-processing device 1 to input record character strings in the input entries in the input image data displayed on the monitor while seeing the input image data. A save button is displayed in the input image data. When an operation of pressing the save button is performed, the recording unit 193 extracts the third feature amounts including the character strings newly input in the input entries of the input image data in addition to the third feature amounts which have already been acquired with regard to the document form (step S711).

The recording unit 193 records record character strings and identifiers of form image data on the database 4 in association therewith (step S712). Specifically, the recording unit 193 sets the input character strings as the record character strings with regard to the character strings input in the input entries in step S711 and sets the character strings specified by comparing the first feature amounts with the third feature amounts as the record character strings with regard to the other record characters. Then, the recording unit 193 records the record character string and the identities of the form image data on the database 4 in association therewith.

After step S712, the image-processing device 1 ends the process of FIG. 7.

The image-processing device 1 may update the first feature amounts through the process of FIG. 7. For example, the image-processing device 1 may re-perform the processing flow of FIG. 6 after step S711. Alternatively, the image-processing device 1 may update the first feature amounts by performing additional learning after step S711 without re-performing the process on the data processed in FIG. 6. Further, in the case of YES in step 708, the image-processing device 1 may update the first feature amounts by re-performing the processing flow of FIG. 6 or additional learning.

The image-processing device 1 updates the first feature amounts through the process of FIG. 7 to increase the number of pieces of sample data and improve precision of the first feature amounts, and thus an improvement in precision in which the image-processing device 1 extracts the recording character strings is expected. When a record character string is added through the process of FIG. 7, the image-processing device 1 can also extract a newly added recording character string from image data, and thus a reduction in the effort for the operator to input the character string is expected.

Through the process illustrated in FIG. 7, the image-processing device 1 can automatically record the record character strings in the image data of a newly input document form in accordance with the record character strings and the image data of the document form recorded in advance by the operator. Accordingly, the image-processing device 1 can reduce the effort for the operator to record the record character string in the document form.

Even though no record character string is entered in the document form, the image-processing device 1 outputs the input image data when there are no entries corresponding to the record character strings which had to be originally entered. Thus, it is possible to find a mistake which had not been input in the entries of the document form which had to be originally entered and easily record the record character strings indicated by the entries.

Second Embodiment

In a second embodiment, a case in which the image-processing device 1 treats a plurality of formats of a document form will be described.

Figure 9:
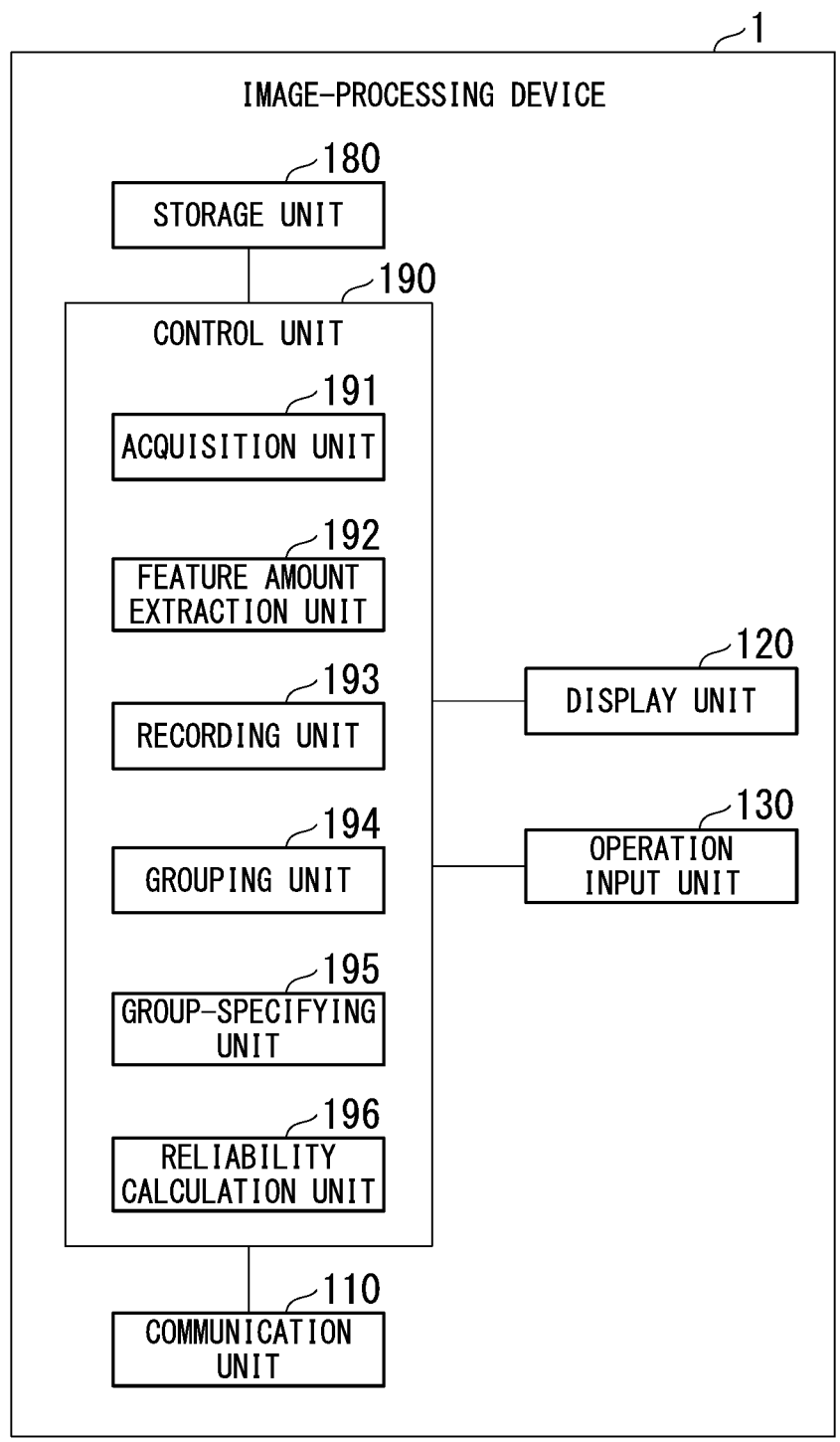
FIG. 9 is a schematic block diagram illustrating a functional configuration of an image-processing device according to a second embodiment.

FIG. 9 is a schematic block diagram illustrating a functional configuration of an image-processing device according to a second embodiment.

As illustrated in FIG. 9, the image-processing device 1 according to the second embodiment further has the functions of a grouping unit 194 and a group-specifying unit 195 in addition to each functional unit illustrated in FIG. 3.

Figure 10:
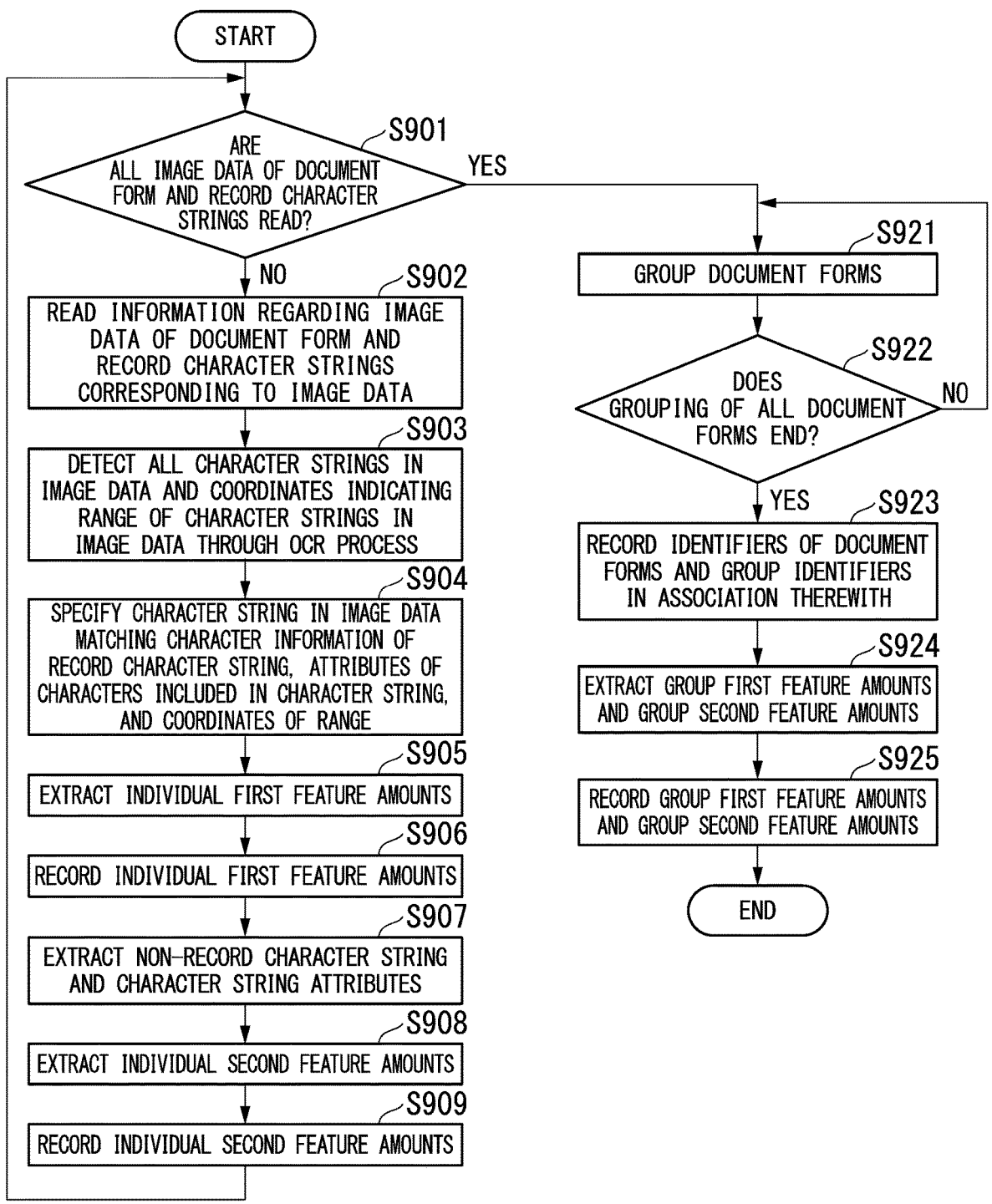
FIG. 10 is a first diagram illustrating a processing flow of the image-processing device according to the second embodiment.

FIG. 10 is a first diagram illustrating a processing flow of the image-processing device according to the second embodiment.

Next, a processing flow of the image-processing device 1 according to the second embodiment will be described in order.

A plurality of combinations of image data of a plurality of document forms with different formats and record character strings described in each document form are recorded for each document form on the database 4. In this state, the operator operates the image-processing device 1 and instructs the image-processing device 1 to start a process.

The acquisition unit 191 of the image-processing device 1 determines whether information regarding the image data of the document form and the record character strings corresponding to the image data is all read from the database 4 (step S901). In the case of NO, the acquisition unit 191 reads the information regarding the image data of the document form and the record character strings corresponding to the image data from the database 4 (step S902). The acquisition unit 191 outputs the image data and the record character strings to the feature amount extraction unit 192.

The feature amount extraction unit 192 detects all the character strings in the image data and the coordinates in the image data by performing the OCR process on the image data (step S903). The character string is a unity of characters formed by a plurality of characters. The feature amount extraction unit 192 analyzes the range of one unity in accordance with an interval or the like from other characters, extracts one character or a plurality of characters included in the range as a character string, and detects coordinates indicating the range of the character string in the image data. The characters included as the character string may include signs such as ideographs or phonographs, marks, and icon images.

The feature amount extraction unit 192 compares the character string extracted from the image data through the OCR process with the record character string read from the database 4 along with the image data. The feature amount extraction unit 192 specifies the character string in the image data matching character information of the record character string among the character strings extracted from the image data through the OCR process, attributes of characters included in the character string, and the coordinates of the range (step S904).

As described in the first embodiment, the attributes of the characters are information expressed by numbers, alphabetical letters, hiragana letters, kanji, the number of characters, character heights, and fonts. The coordinates of the range of the character string are coordinates indicating a position of a character string in a document form. For example, the coordinates of the range of the character string may be information indicating coordinates of a first character, coordinates of an end character, or the like included in the character string. The attributes of characters included in a character string and the coordinates of a range of the character string are collectively referred to as attributes of the character string or character string attributes.

As in the case of the first embodiment, the character information here may be only a character string or may include character string attributes. That is, the feature amount extraction unit 192 may determine whether the record character string and the character string in the image data are the same as the character strings. Alternatively, the feature amount extraction unit 192 may determine the sameness of the character string attributions in addition to the sameness of the characters.

When the feature amount extraction unit 192 cannot uniquely specify the character string in which the record character string matches the character information, the image-processing device 1 may exclude the character image from a processing target (an extraction target of the first feature amount). Alternatively, the image-processing device 1 may cause the display unit 120 to display an image in which a range of each of candidates for the record character string is indicated by a frame and may specify the record character string to the character string selected by the operator. As described in the first embodiment, the candidate for the record character string mentioned here is a character string associated with the record character string determined not to be uniquely specified among the character strings in which the character information matches the character information of the record character string. Specifying the record character string mentioned here means determining any one of the character strings in the document form as one record character string.

When the feature amount extraction unit 192 determines that the character information of each of the plurality of character strings in the document form matches the character information of one record character string, the plurality of character strings are candidates for the recording information. When the operator selects any one of the plurality of character strings, the record character string is uniquely specified.

Subsequently, the feature amount extraction unit 192 extracts a feature amount of each document form and each record character string using the character string attributes extracted for each document form and each record character string (step S905). Specifically, the feature amount extraction unit 192 processes the character string attributes of the character string associated with the record character string in step S904 as the feature amounts. Since a plurality of kinds of formats are set as targets in the second embodiment, the first feature amounts cannot be extracted directly unlike the case of step S604 of FIG. 7 at the time point of step S905 in which the document forms are not grouped for each format. Accordingly, the feature amount extraction unit 192 extracts the feature amounts for each document form and each record character string as preparation to extract the first feature amounts of each group. The feature amounts of each document form and each record character string are referred to as individual first feature amounts.

The feature amount extraction unit 192 records the obtained individual first feature amounts on the database 4 in association with the identifier of the document form and the identifier of the record character string (step S906). As the identifier of the record character string, for example, coordinate values indicating the position of the record character string can be used.

For example, the feature amount extraction unit 192 records the individual first feature amounts indicating the character attributes, the coordinates indicating the range of the character string, or the like of each of the date and time 51, the order organization 52, the commodity name 53, the quantity 54, and the amount of money 55 which are the record character string included in the format of the document form 5 in FIG. 4 on the database 4 in association with the identifier of the document form 5 and the identifier of the record character string for each document form and each record character string.

The feature amount extraction unit 192 extracts a non-record character string in the image data which does not match the character information included in the record character string and character string attributes of the non-record character string (step S907).

As described above, the non-record character string is a character string which is not recorded by the operator, that is, a character string other than the record character string. The character string attributes may include one or both of information indicating the attributes of the characters included in the character string and information indicating the coordinates of the range of the character string.

The feature amount extraction unit 192 extracts the feature amounts of each document form and each non-record character string using the character string attributes extracted for each document form and each non-record character string (step S908).

Specifically, the feature amount extraction unit 192 processes the attributes of each character string (the character string attributes) of the character string not associated with any record character string in step S904 as the feature amounts. As in the first feature amounts, the feature amounts common to the document forms with the same format cannot be generated at the time point of step S908 in which the document forms are not grouped for each format.

Thus, the feature amount extraction unit 192 extracts the feature amounts for each document form and each non-record character string as preparation to extract the second feature amounts of each group. The feature amounts of each document form and each non-record character string are referred to as individual second feature amounts.

The feature amount extraction unit 192 may generate the individual second feature amounts in which the plurality of non-record character strings are collected for each document form. For example, the feature amount extraction unit 192 may generate one individual second feature amount for one document form.

The feature amount extraction unit 192 records the obtained individual second feature amounts on the database 4 in association with the identifier of the document form and the identifier of the non-record character string (step S909). As the identifier of the non-record character string, for example, coordinate values indicating the position of the non-record character string can be used.

For example, the feature amount extraction unit 192 records the individual second feature amounts indicating the name 501 of an ordering party, the emblem image of the ordering party, the title 503 of the document form, and the greeting 504 which are the non-record character string included in the format of the document form 5 in FIG. 4 on the database 4 in association with the identifier of the document form 5 and the identifier of the non-record character string.

The information regarding the image data of the document form with each format and the record character string corresponding to the image data are recorded on the database 4 in association with each of the plurality of formats of the document forms. The acquisition unit 191 of the image-processing device 1 repeats the processes of steps S901 to S909 until the information regarding the image data and the record character string in all the document forms is read.

When it is determined in step S901 that the acquisition unit 191 reads all the information regarding the image data of the document forms and the record character string corresponding to the image data from the database 4 (YES in step S901), the grouping unit 194 groups the document forms (step S921). The grouping unit 194 groups the document forms based on the individual second feature amounts included in the image data of the document forms. For example, the grouping unit 194 groups the document forms based on the degree of matching of the non-record character strings indicated by the individual second feature amounts, the degree of matching between the emblem images, the degree of matching between the coordinates of the range of the non-record character strings, or the like. The grouping unit 194 determines the group identifiers of the document forms in the grouping process. The grouping unit 194 determines whether the grouping of all the document forms ends (step S922).

The grouping unit 194 repeats the process of step S921 when the grouping of all the document forms is not completed. Specifically, when the grouping unit 194 determines in step S922 that there is a document form which has not been grouped (NO in step S922), the process returns to step S921.

When the grouping unit 194 completes the grouping of all the document forms (YES in step S922), identifiers of the document forms and group identifiers granted to the document forms are recorded in a group table (a record table) of the database 4 in association therewith (step S923).

Then, the feature amount extraction unit 192 reads each individual first feature amount and each individual second feature amount of one document form or a plurality of document forms belonging to a certain group from the database 4. The feature amount extraction unit 192 extracts each group first feature amount and each group second feature amount corresponding to each individual first feature amount and each individual second feature amount of the document form belonging to the group (step S924). Each group first feature amount may be a value such as an average of the individual first feature amounts of the document form belonging to the group.

Similarly, each group second feature amount may be a value such as an average of the individual second feature amounts of the document form belonging to the group. Each group first feature amount and each group second feature amount may not be an average of the individual first feature amounts or an average of the individual second feature amounts, and each group first feature amount and each group second feature amount may be extracted using any scheme as long as the feature amounts are feature amounts calculated so that the record character strings or the non-record character string of one document form or the plurality of document forms belonging to the group can be specified using a scheme such as predetermined statistical processing or machine learning.

For example, the feature amount extraction unit 192 may extract the character string attributes of each record character string from the plurality of document forms belonging to the same group and (directly) generate the group first feature amount in step S924. In this case, the feature amount extraction unit 192 passes the extraction and the recording of the individual first feature amounts in steps S905 and S906 (does not particularly perform any process).

Conversely, the feature amount extraction unit 192 extracts the individual second feature amounts in step S908 so that the individual second feature amounts can be used in the grouping in step S921. Here, in step 921, the grouping unit 194 may group the document forms using the non-recording character strings without using the individual second feature amounts. In this case, the feature amount extraction unit 192 may (directly) extract the group second feature amounts from the character string attributes of the non-record character strings of the plurality of document forms belonging to the same group in step S924. In this case, the feature amount extraction unit 192 does not particularly perform any process in steps S907 to S909.

The feature amount extraction unit 192 calculates each group first feature amount and each group second feature amount for each group and records each group first feature amount and each group second feature amount on the database 4 in association with the identifiers of the groups (step S925).

After step S925, the image-processing device 1 ends the process of FIG. 10.

Through the above processes, processing procedure in the image-processing device 1 can extract the information (the group first feature amounts and the group second feature amounts) necessary to reduce the effort for the operator to record the record character string for each group of the document forms and accumulate the information on the database 4. Thus, the image-processing device 1 can receive an input of image data of a new document form and automatically record a record character string included in the document form on the database 4. The process will be described with reference to FIG. 11.

Figure 11:
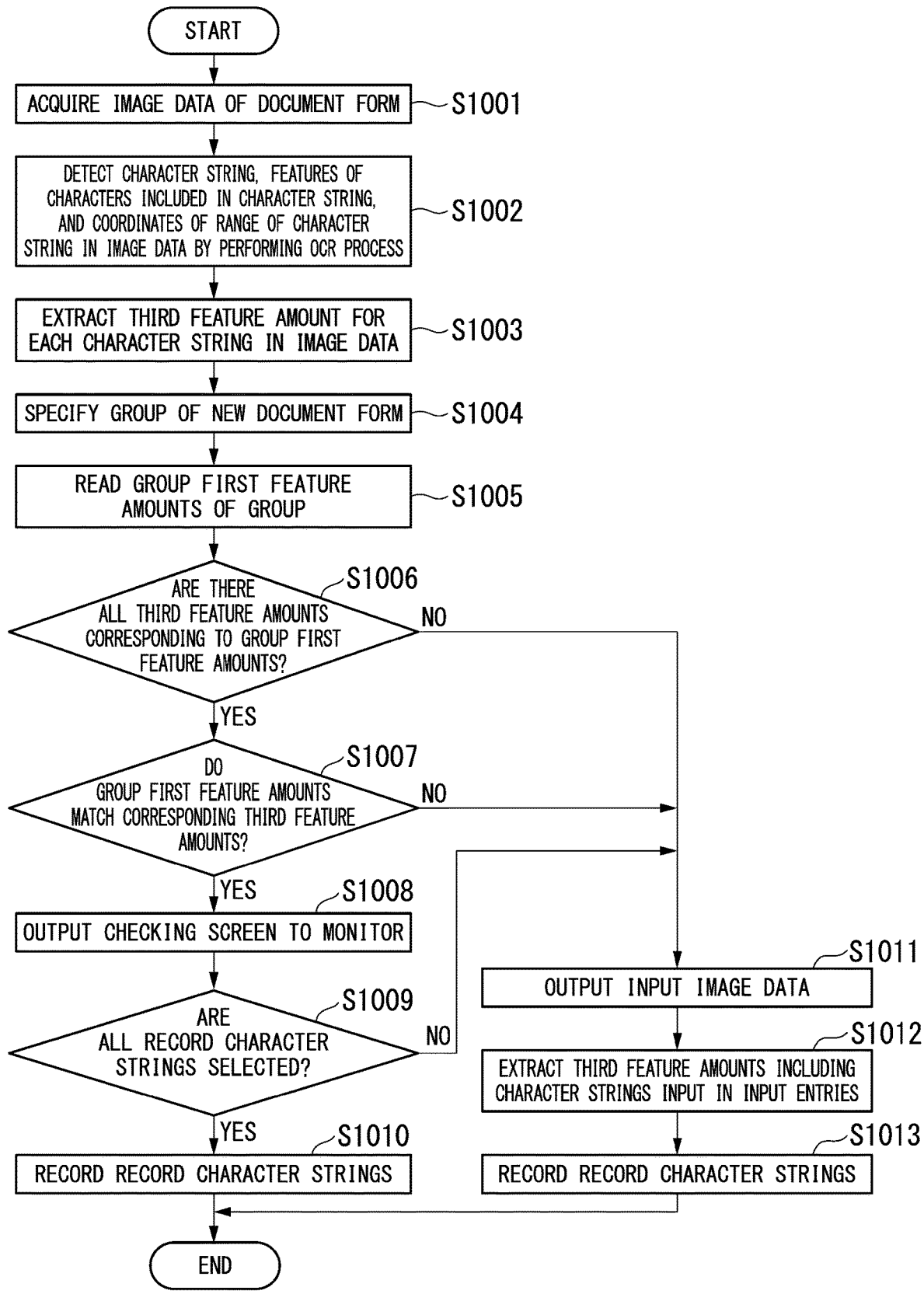
FIG. 11 is a second diagram illustrating a processing flow of the image-processing device according to the second embodiment.

FIG. 11 is a second diagram illustrating a processing flow of an image-processing device according to the second embodiment. FIG. 11 illustrates an example of a processing procedure in which the image-processing device 1 extracts the record character strings from newly input image data.

The operator performs an operation causing the image-reading device 2 to read a new document form. Then, the image-reading device 2 generates the image data of the document form and outputs (transmits) the image data to the image-processing device 1. The acquisition unit 191 of the image-processing device 1 acquires the image data from the data received by the communication unit 110 (step S1001). The acquisition unit 191 outputs the image data to the feature amount extraction unit 192. The feature amount extraction unit 192 detects a character string, the features of the characters (the character attributes) included in the character string, and the coordinates of the range of the character string in the image data for each character string by performing the OCR process on the image data (step S1002). The feature amount extraction unit 192 extracts third feature amounts obtained by processing the detected information as the feature amounts for each character string in the image data (step S1003). The third feature amounts are information indicating the features of the character string included in the document form of the newly read image data.

Subsequently, the group-specifying unit 195 reads the group second feature amounts used to specify the group of the new document form among the group second feature amounts stored on the database 4. The group second feature amounts may be, for example, feature amounts corresponding to the emblem image 502 of the ordering party displayed in the image data of the document form. The group-specifying unit 195 determines whether the information indicated in certain second feature amounts can be specified from the image data of the document form acquired in step S1001. The group-specifying unit 195 performs a similar process using the group second feature amounts of all the groups. When the information matching the group second feature amounts read from the database 4 can be specified from the image data of the newly read document form, the group-specifying unit 195 specifies a group that has the group second feature amounts as a group of the image data of the newly read document form (step S1004). Thereafter, the group-specifying unit 195 reads one group first feature amount or the plurality of group first feature amounts of the group from the database 4 (step S1005). The group-specifying unit 195 outputs the third feature amount and one group first feature amount or the plurality of group first feature amounts to the recording unit 193. The group first feature amount is a feature amount for specifying one recording character string or the plurality of record character strings in the document form belonging to the group.

The recording unit 193 acquires the third feature amount and one group first feature amount or the plurality of group first feature amounts of one character string or the plurality of character strings in the image data. The recording unit 193 determines whether there are all the third feature amounts including the coordinates corresponding to the coordinates indicated by the group first feature amounts by using the coordinates indicating the range of the character string included in each group first feature amount (step S1006). When there are all the third feature amounts including the coordinates corresponding to the coordinates of the group first feature amounts (YES in step S1006), there is description of characters in all the entries in the document form corresponding to the recording character string. Conversely, when there are only some of the third feature amounts including the coordinates corresponding to the coordinates of the group first feature amounts (NO in step S1006), there is no description of the characters in any entry in the document form.

In the case of YES in step S1006, the recording unit 193 determines whether each character attribute included in the group first feature amount matches each character attribute included in the third feature amount corresponding to the first feature amount specified based on the coordinates (step S1007).

When the determination result of step S1007 is YES, that is, the character attributes match each other, the recording unit 193 generates a checking screen in which a rectangular frame is displayed in the range of the record character string based on the coordinates indicated by one third feature amount or the plurality of third feature amounts in the currently processed image data. The recording unit 193 outputs the checking screen to a monitor (step S1008). As in the case of step S707 of FIG. 7, the display unit 120 displays the record character string on the checking screen in the mode in accordance with the reliability.

The operator can check a rectangular region displayed on the checking screen and check a record character string which the image-processing device 1 will record. Thus, the operator can check whether the record character string is insufficient. That is, the operator can check whether all the record character strings are selected (whether the record character strings are surrounded by the rectangular frames on the checking screen).

An icon image of one of OK and NG buttons is displayed on the checking screen. The operator can give an instruction indicating that the selected record character string is not insufficient by selecting the OK button in the icon image. Conversely, the operator can give an instruction indicating that the selected record character string is insufficient by selecting the NG button in the icon image of the button.

The recording unit 193 determines whether all the record character strings are selected in response to pressing of the icon image of the button by the operator (step S1009). When all the record character strings are selected (YES in step S1009), the recording unit 193 records the record character strings in the record table in association with identification information of the document form (step S1010).

For example, a case in which the third feature amount a3, the third feature amount b3, the third feature amount c3, and the third feature amount d3 can be acquired from the image data of the document form will be exemplified. A case in which the third feature amount a3 matches a group first feature amount g11 recorded in advance on a database, the third feature amount b3 matches a group first feature amount g12, the third feature amount c3 matches a group first feature amount g13, and the third feature amount d3 matches a group first feature amount g14 will be exemplified. In this case, the recording unit 193 records the character strings corresponding to the third feature amount a3, the third feature amount b3, the third feature amount c3, and the third feature amount d3 as the record character strings on the record table of the document form. The character strings corresponding to the third feature amounts mentioned here are character strings of extraction sources of the third feature amounts.

After step S1010, the image-processing device 1 ends the process of FIG. 11.

When step S1006 is NO, step S1007 is NO, or step S1009 is NO, as described above, the recording unit 193 performs a process in a case in which there are no third feature amounts including the coordinates corresponding to the coordinates indicated by the group first feature amounts. Specifically, the recording unit 193 generates input image data of a form image (an image of a document form) in which input entries are provided in the ranges of the coordinates of the group first feature amounts for which there are no third feature amounts at the corresponding coordinates in the image data and outputs the input image data to the monitor (step S1011). The input image data may be data described in a markup language such as HTML or XML. As in the case of the display of the checking screen in step S710 of FIG. 7, the display unit 120 may display the record character strings which can be specified on a form image in a display mode in accordance with the reliability.

The operator operates an input device such as a keyboard of the image-processing device 1 to input record character strings in the input entries in the input image data displayed on the monitor while seeing the input image data. A save button is displayed in the input image data. When an operation of pressing the save button is performed, the recording unit 193 extracts the third feature amounts including the character strings newly input in the input entries of the input image data in addition to the third feature amounts which have already been acquired with regard to the document form (step S1012).

The recording unit 193 records record character strings and identifiers of form image data on the database 4 in association therewith (step S1013). Specifically, the recording unit 193 sets the input character strings as the record character strings with regard to the character strings input in the input entries in step S711 and sets the character strings specified by comparing the first feature amounts with the third feature amounts as the record character strings with regard to the other record characters. Then, the recording unit 193 records the record character string and the identifier of the form image data on the database 4 in association therewith.

After step S1013, the image-processing device 1 ends the process of FIG. 11.

The image-processing device 1 may update the first feature amounts through the process of FIG. 11. For example, the image-processing device 1 may re-perform the processing flow of FIG. 6 after step S1012. Alternatively, the image-processing device 1 may update the first feature amounts by performing additional learning after step S1012 without re-performing the process on the data processed in FIG. 6. Further, in the case of YES in step S1009, the image-processing device 1 may update the first feature amounts by re-performing the processing flow of FIG. 6 or additional learning.

The image-processing device 1 updates the first feature amounts through the process of FIG. 11 to increase the number of pieces of sample data, and thus an improvement in precision of the first feature amounts is achieved and an improvement in precision in which the image-processing device 1 extracts the recording character strings is expected. When a record character string is added through the process of FIG. 11, the image-processing device 1 can also extract a newly added recording character string from image data, and thus a reduction in the effort for the operator to input the character string is expected.

Through the process illustrated in FIG. 11, the image-processing device 1 can automatically record the record character strings in the image data of the document form irrespective of the kind of newly input document form in accordance with the record character strings and the image data of the document form of each of the plurality of formats recorded in advance by the operator. Accordingly, the image-processing device 1 can reduce the effort for the operator to record the record character string in the document form.

Even though no record character string is entered in the document form, the image-processing device 1 outputs the input image data when there are no entries corresponding to the record character strings which had to be originally entered. Thus, it is possible to find a mistake which had not been input in the entries of the document form which had to be originally entered and easily record the record character strings indicated by the entries.

Third Embodiment

As another example of the process of the image-processing device 1, the operator may register a group of document forms beforehand in the image-processing device 1. For example, when the operator registers the image data of the document forms in the past, the operators inputs group identifiers in accordance with the kinds of document forms to register the group identifiers in association with the image data of the document forms on the database 4 beforehand. Then, different kinds of forms are not mixed due to a mistake or the like of the process of the image-processing device 1 in the same group, and thus the first feature amounts can be extracted with high precision. In this case, at the time of registration, the operator specifies a group of a new form using the second feature amounts as in step S1004 while inputting the group of the document form.

Fourth Embodiment

As still another example of the process of the image-processing device 1, the image-processing device 1 may not only group the document forms by using the second feature amounts but also group the document forms by using the first feature amounts or the first feature amounts with the second feature amounts. The first feature amounts are the feature amounts of the record character string, but the coordinates of the record character string or the character attributes are considered to be the same as long as the document forms are the same kind of document forms, and thus the forms can be grouped using the first feature amounts. The operator can perform the first grouping according to a fourth embodiment and can read the record character string with high precision in an OCR process by grouping new document forms using the first feature amounts through the process of step S1004.

In this case, the acquisition unit 191 acquires the image data of a plurality of pieces of form image data and record character strings which are recording targets among the character strings included in the form image data. Then, the grouping unit 194 groups the form image data based on the first feature amounts. The feature amount extraction unit 192 extracts the record character string using the first feature amounts corresponding to the form image data included in the group.

Fifth Embodiment

In the second embodiment, the group of the new form is specified based on the second feature amount in step S1004. However, as another processing mode, the image-processing device 1 specifies all the groups set by the operator in order for each group, reads the first feature amounts, and counts the number of feature amounts matching the third feature amounts without performing a process of specifying the group. In the case of a correct group, the most first feature amounts ought to match the most third feature amounts. Therefore, the image-processing device 1 records the character string included in each of the third feature amounts of a specific group in step S1008 when the number of feature amounts matching each other is the most. Thus, even when no group is specified, the record character string can be recorded.

In this case, the acquisition unit 191 acquires the image data of a plurality of pieces of form image data and record character strings which are recording targets among the character strings included in the form image data. Then, the feature amount extraction unit 192 extracts the first feature amounts indicating features of the record character string or the second feature amounts indicating recognition information other than the record character string based on the recognition result for the form image data acquired by the acquisition unit 191. The feature amount extraction unit 192 extracts the record character string using the first feature amounts corresponding to the form image data included in a predetermined group set in advance.

As described above, the reliability calculation unit 196 calculates the reliability of the character recognition result on the document image which is a character recognition target based on descriptive feature amounts of the character string of a specific item included in the document image. The display unit 120 outputs a character recognition result image indicating the character string of the specific item in the display mode in accordance with the reliability calculated by the reliability calculation unit 196.

In this way, the image-processing device 1 can evaluate precision of a result of optical characteristic recognition through calculation of the reliability. Then, the image-processing device 1 can present the evaluation of the precision of the result of the optical character recognition to the operator by displaying the reliability. The operator can ascertain a portion which is noteworthy with reference to the display of the reliability and take measures as necessary.

In particular, the reliability calculation unit 196 calculates the reliability based on the descriptive feature amounts of the character string, and thus the image-processing device 1 can evaluate the precision of the result of the optical character recognition from the viewpoint of the format of the document. For example, the reliability calculation unit 196 calculates the reliability based on the reliability of the result of the character recognition and the feature amounts of the format of the document image which is the character recognition target. Thus, the reliability can be expected to be calculated with higher precision than that calculated based on only the reliability of the result of the character recognition.

The reliability calculation unit 196 calculates the reliability on the basis of the feature amounts of a format of a document image which is a character recognition target among the feature amounts which are recorded in advance based on results of learning obtained using a plurality of document images and indicate features of character strings of items for each kind of document image and each specific item.

Thus, the reliability calculation unit 196 can calculate the reliability based on the first feature amounts used for the recording unit 193 to specify the record character string. By calculating the reliability based on the feature amounts used for the recording unit 193 to specify the record character string, the reliability calculation unit 196 is expected to calculate the reliability with high precision.

The reliability calculation unit 196 calculates the reliability based on the degree of variation in the feature amount recorded in advance.

When the degree of variation in the feature amounts is high, possible reasons that the format of a document given to the image-processing device is not constant or features of the format analyzed by the image-processing device 1 do not sufficiently reflect an actual format are conceivable. In this case, there is a relatively high possibility of the format of a processing target document image being different from a format assumed in the image-processing device 1. From this viewpoint, the reliability of the processing result for the processing target document image processed by the image-processing device 1 is considered to be low.

Conversely, when the degree of variation in the feature amounts is low, it is considered that the format of a document given to the image-processing device is constant and features of the format analyzed by the image-processing device 1 sufficiently reflect an actual format. In this case, a processor of a processing target document image is the same as a format assumed in the image-processing device 1 and the reliability of the processing result for the processing target document image by the image-processing device 1 is considered to be high. That is, the image-processing device 1 is expected to appropriately process a processing target image.

From this viewpoint, the reliability calculation unit 196 can calculate the reliability with high precision by calculating the reliability based on the degree of variation in the feature amounts recorded in advance.

Alternatively, the reliability calculation unit 196 calculates the reliability of the feature amounts in a document image which is a character recognition target on the basis of the degree of deviation in feature amounts recorded in advance.

The reliability calculation unit 196 calculates the reliability of the feature amounts in a document image which is a character recognition target on the basis of the degree of deviation in feature amounts recorded in advance.

When the degree of deviation is high, the reason that the format of a processing target document image is different from a format assumed in the image-processing device 1 or the features of the format analyzed by the image-processing device 1 are not appropriate for a processing target document image even though the assumed format is matched is considered. In this case, the reliability of the processing result for the processing target document image by the image-processing device 1 is considered to be relatively low.

When the degree of deviation in the feature amounts in the document image of the character recognition target with respect to the feature amounts recorded in advance is low, it is considered that the format of the processing target document image is the same as the format assumed by the image-processing device 1 and features of the format analyzed by the image-processing device 1 are appropriate for the processing target document image. In this case, the reliability of the processing result for the processing target document image by the image-processing device 1 is considered to be relatively high. That is, the image-processing device 1 is expected to appropriately process a processing target image.

From this viewpoint, the reliability calculation unit 196 calculates the reliability on the basis of the degree of deviation of the feature amounts in a document image which is a character recognition target in feature amounts recorded in advance, and thus can calculate the reliability with high precision.

Next, a configuration according to an embodiment of the present invention will be described with reference to FIG. 12.

Figure 12:
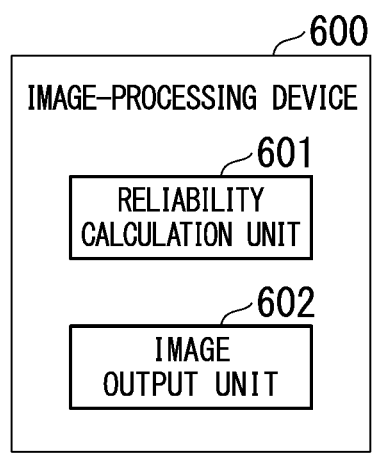
FIG. 12 is a diagram illustrating an example of a configuration of an image-processing device according to an embodiment.

FIG. 12 is a diagram illustrating an example of a configuration of an image-processing device according to an embodiment. An image-processing device 600 illustrated in FIG. 12 includes a reliability calculation unit 601 and an image output unit 602.

In the configuration, the reliability calculation unit 601 calculates the reliability of a character recognition result on the document image which is a character recognition target based on descriptive feature amounts of the character string of a specific item included in the document image. The image output unit 602 outputs a character recognition result image displaying the character string of the specific item in the display mode in accordance with the reliability.

In this way, the image-processing device 600 can evaluate precision of a result of optical characteristic recognition through calculation of the reliability. Then, the image-processing device 600 can present the evaluation of the precision of the result of the optical character recognition to the operator by displaying the reliability. The operator can ascertain a portion which is noteworthy with reference to the display of the reliability and take measures as necessary.

In particular, the reliability calculation unit 601 calculates the reliability based on the descriptive feature amounts of the character string, and thus the image-processing device 600 can evaluate the precision of the result of the optical character recognition from the viewpoint of the format of the document. For example, the reliability calculation unit 601 calculates the reliability based on the reliability of the result of the character recognition and the feature amounts of the format of the document image which is the character recognition target, and thus the reliability can be expected to be calculated with higher precision than that calculated based on only the reliability of the result of the character recognition.

Each device described above contains a computer system. A program causing each device to perform each process described above is stored in a computer-readable recording medium of the device. Thus, a computer of each device executes the program to perform the above process. Here, the computer-readable recording medium is a magnetic disk, a magneto-optic disc, a CD-ROM, a DVD-ROM, a semiconductor memory, or the like.

The computer program may be delivered to a computer via a communication line and the computer receiving the computer program may execute the program.

The program may be a program that realizes some of the functions of the above-described processing units. Further, the above-described functions may be so-called differential files (differential programs) that are realized in combination with programs which have already been recorded on a computer system.

The embodiments of the present invention have been described in detail with reference to the drawings, but specific configurations are not limited to the embodiments and designs and the like are also included within the scope of the present invention without departing from the gist of the present invention.

INDUSTRIAL APPLICABILITY

According to the present invention, it is possible to evaluate precision of a result of optical character recognition.

REFERENCE SIGNS LIST

1 Image-processing device
2 Image-reading device
3 Recording device
4 Database
110 Communication unit
120 Display unit
130 Operation input unit
180 Storage unit
190 Control unit
191 Acquisition unit
192 Feature amount extraction unit
193 Recording unit
194 Grouping unit
195 Group-specifying unit
196 Reliability calculation unit

The invention claimed is:

1. An image-processing device, comprising:
at least one memory configured to store instructions; and
at least one processor configured to execute the instructions to;
specify a descriptive feature amount of a character string of a specific item in a target document image that is a target for a character recognition process on the basis of coordinates of the character string indicated by a group descriptive feature amount based on character strings of the specific item included in one or more document images belonging to a group corresponding to the target document image;
calculate reliability of a result of the character recognition process for the character string of the specific item in the target document image on the basis of the specified descriptive feature amount in the target document image and the group descriptive feature amount with respect to the character string of the specific item; and
output an image of the result of the character recognition process representing the character string of the specific item in a display mode in accordance with the reliability.

2. The image-processing device according to claim 1, wherein the at least one processor is configured to execute the instructions to:
calculate the reliability on the basis of a feature amount of a format of the target document image among feature amounts which are recorded in advance based on results of learning obtained using a plurality of document images and indicate features of character strings of items for each kind of document image and each specific item.

3. The image-processing device according to claim 2, wherein the at least one processor is configured to execute the instructions to:

calculate the reliability on the basis of the degree of variation in the feature amount recorded in advance.

4. The image-processing device according to claim 2, wherein the at least one processor is configured to execute the instructions to:

calculate the reliability on the basis of the degree of deviation of a feature amount in the document image which is the character recognition target with respect to the feature amount recorded in advance.

5. An image-processing method, comprising:

specifying a descriptive feature amount of a character string of a specific item in a target document image that is a target for a character recognition process on the basis of coordinates of the character string indicated by a group descriptive feature amount based on character strings of the specific item included in one or more document images belonging to a group corresponding to the target document image;

calculating reliability of a result of the character recognition process for the character string of the specific item in the target document image on the basis of the specified descriptive feature amount in the target document image and the group descriptive feature amount with respect to the character string of the specific item; and outputting an image of the result of the character recognition process representing the character string of the specific item in a display mode in accordance with the reliability.

6. A non-transitory computer-readable storage medium that stores a program causing a computer to perform processing of:

specifying a descriptive feature amount of a character string of a specific item in a target document image that is a target for a character recognition process on the basis of coordinates of the character string indicated by a group descriptive feature amount based on character strings of the specific item included in one or more document images belonging to a group corresponding to the target document image;

calculating reliability of a result of the character recognition process for the character string of the specific item in the target document image on the basis of the specified descriptive feature amount in the target document image and the group descriptive feature amount with respect to the character string of the specific item; and outputting an image of the result of the character recognition process representing the character string of the specific item in a display mode in accordance with the reliability.

* * * * *